Sept. 1, 1936.    R. E. PRUSSO ET AL    2,052,844
REGISTERING APPARATUS
Filed March 2, 1934    9 Sheets-Sheet 3
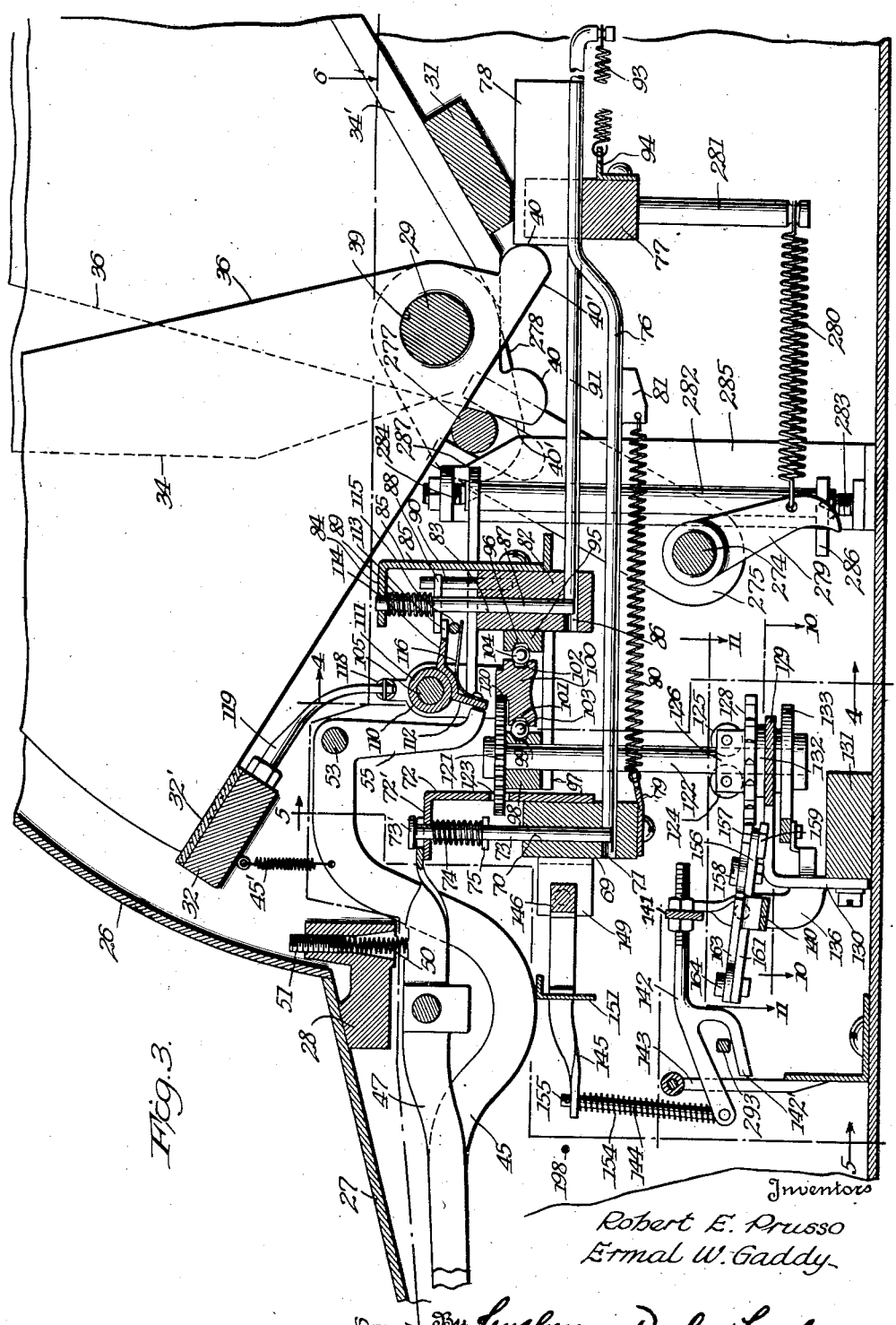
Inventors
Robert E. Prusso
Ermal W. Gaddy
By Cushman, Darby & Cushman
Attorneys

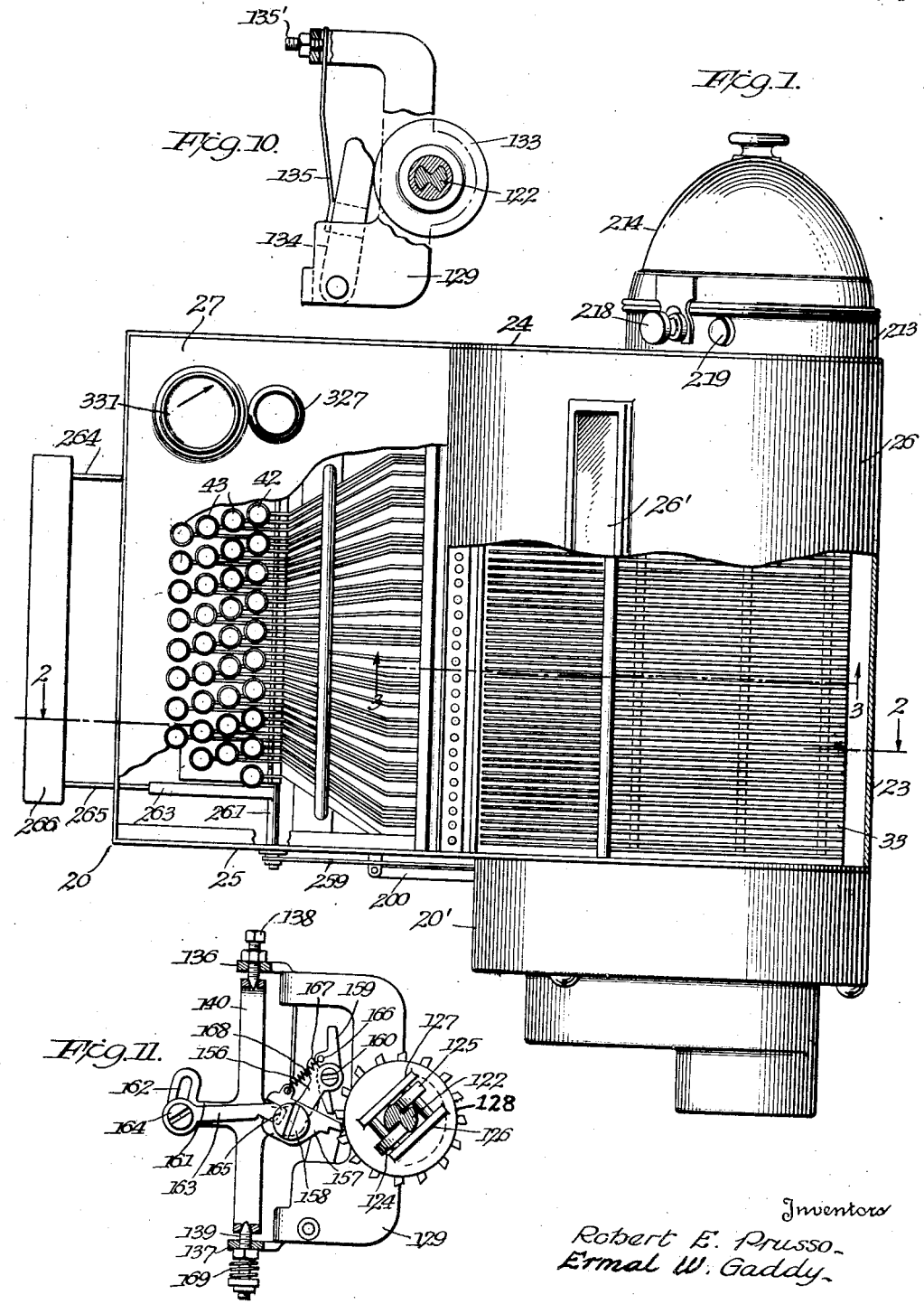

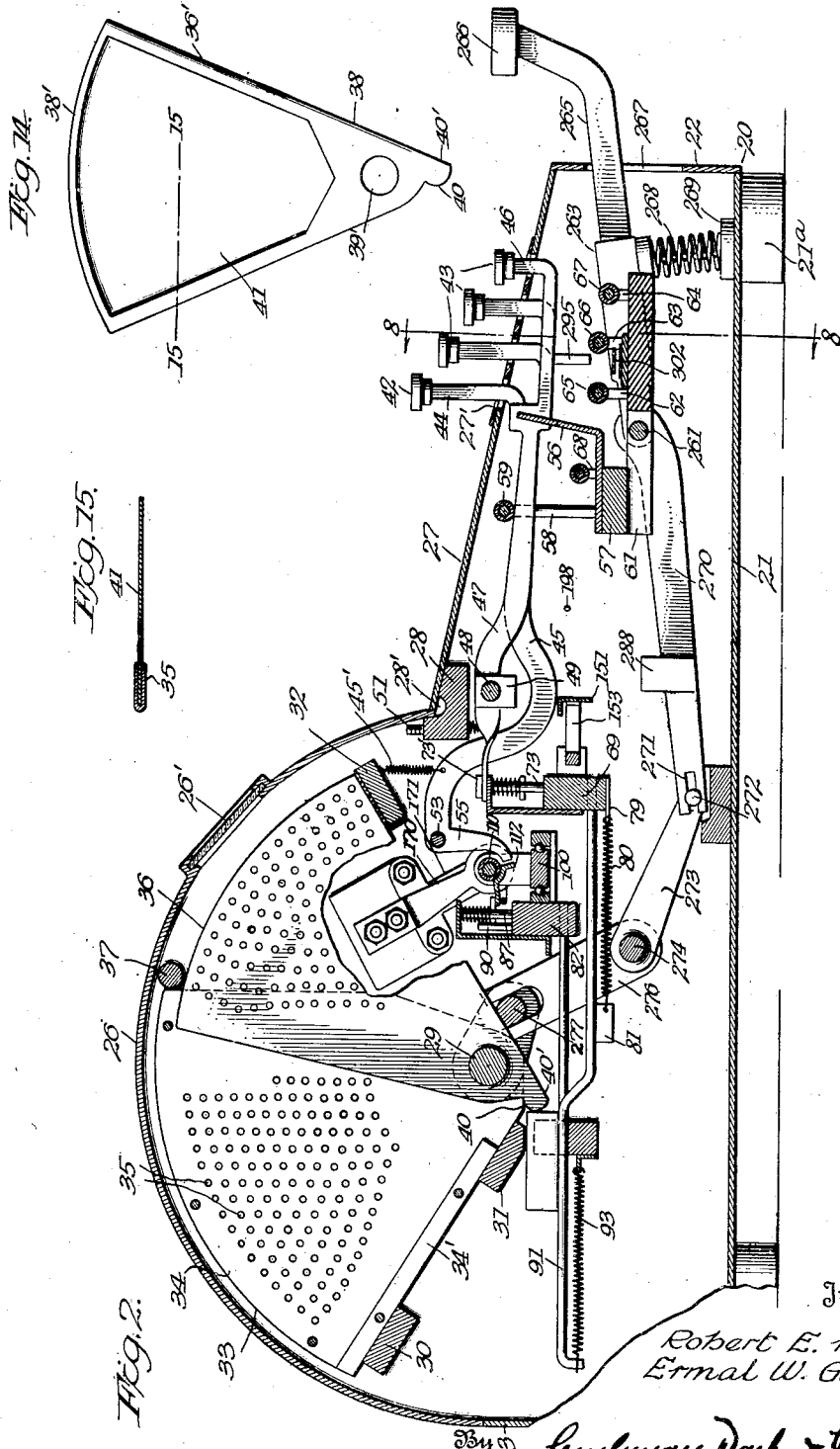

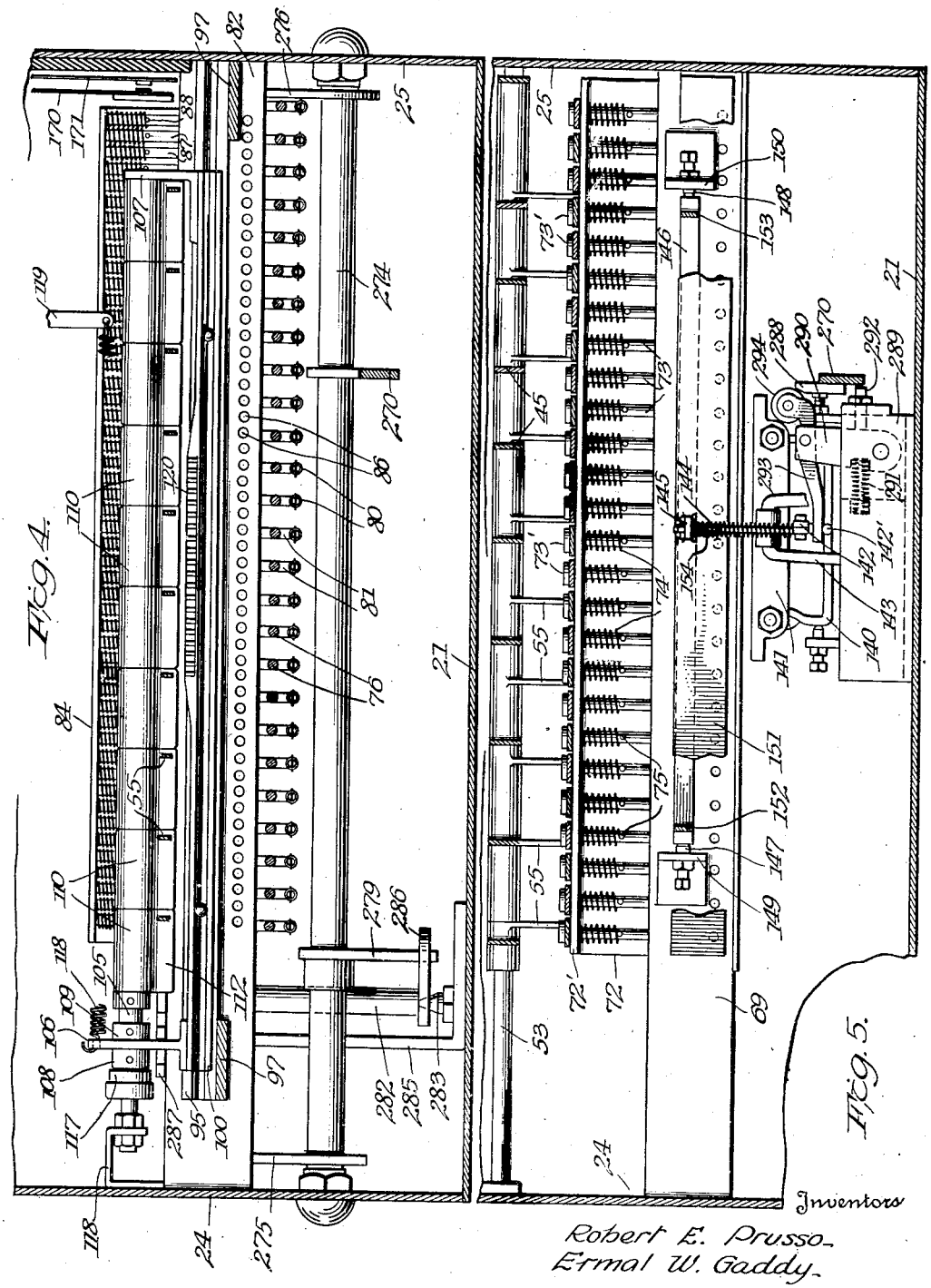

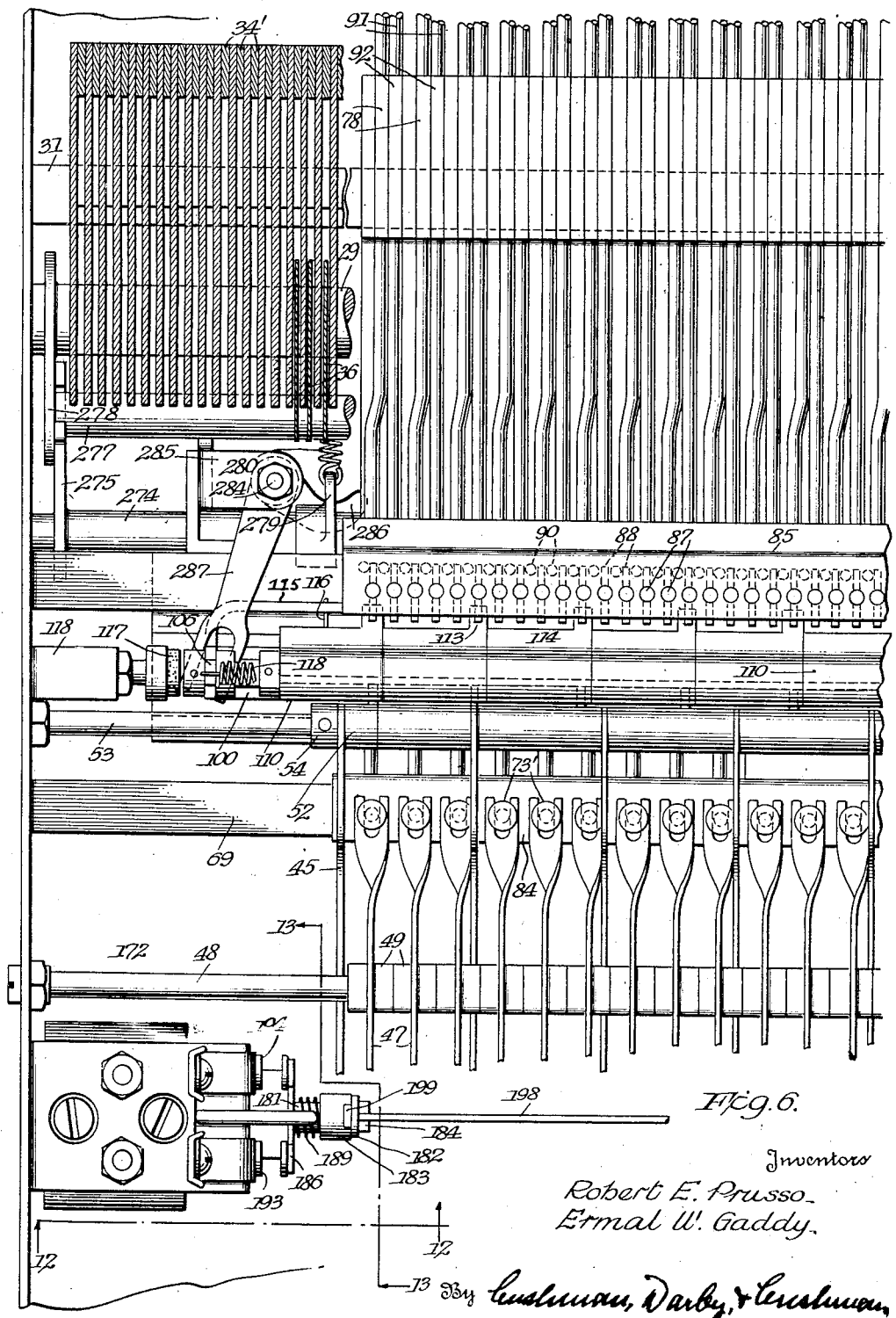

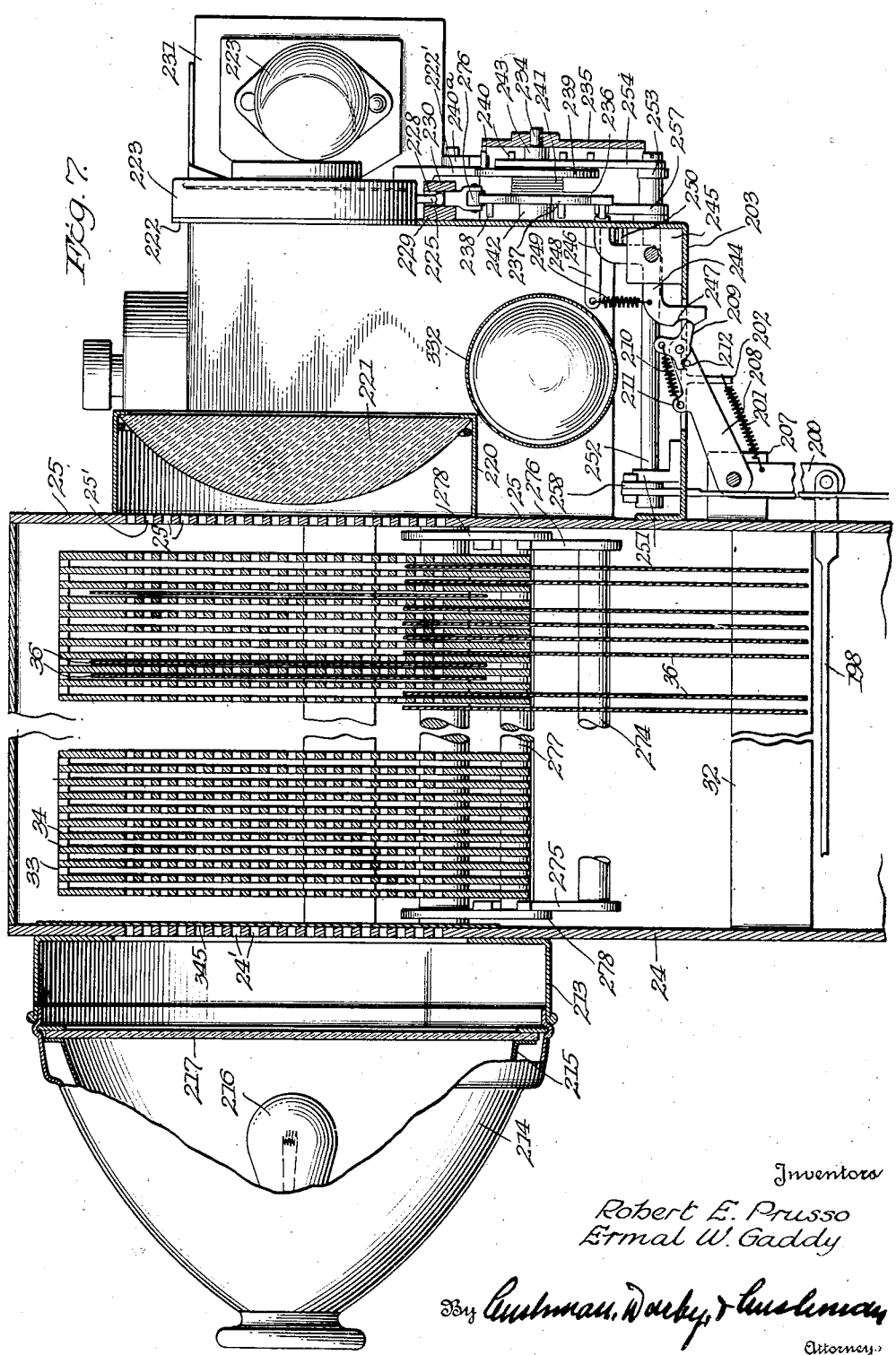

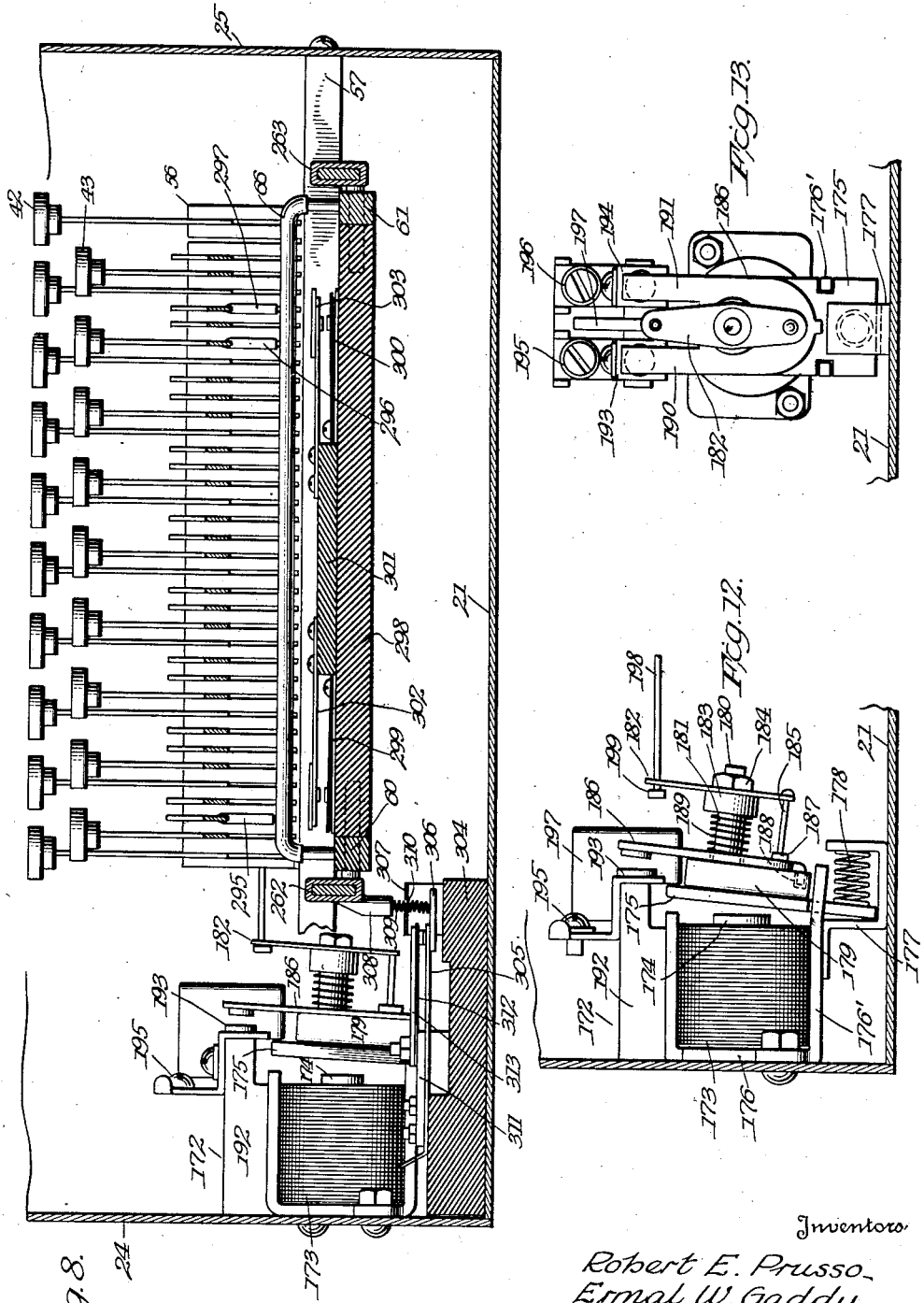

Sept. 1, 1936. R. E. PRUSSO ET AL 2,052,844
REGISTERING APPARATUS
Filed March 2, 1934 9 Sheets-Sheet 8

Inventors
Robert E. Prusso
Ermal W. Gaddy
By Cushman, Darby, & Cushman
Attorneys

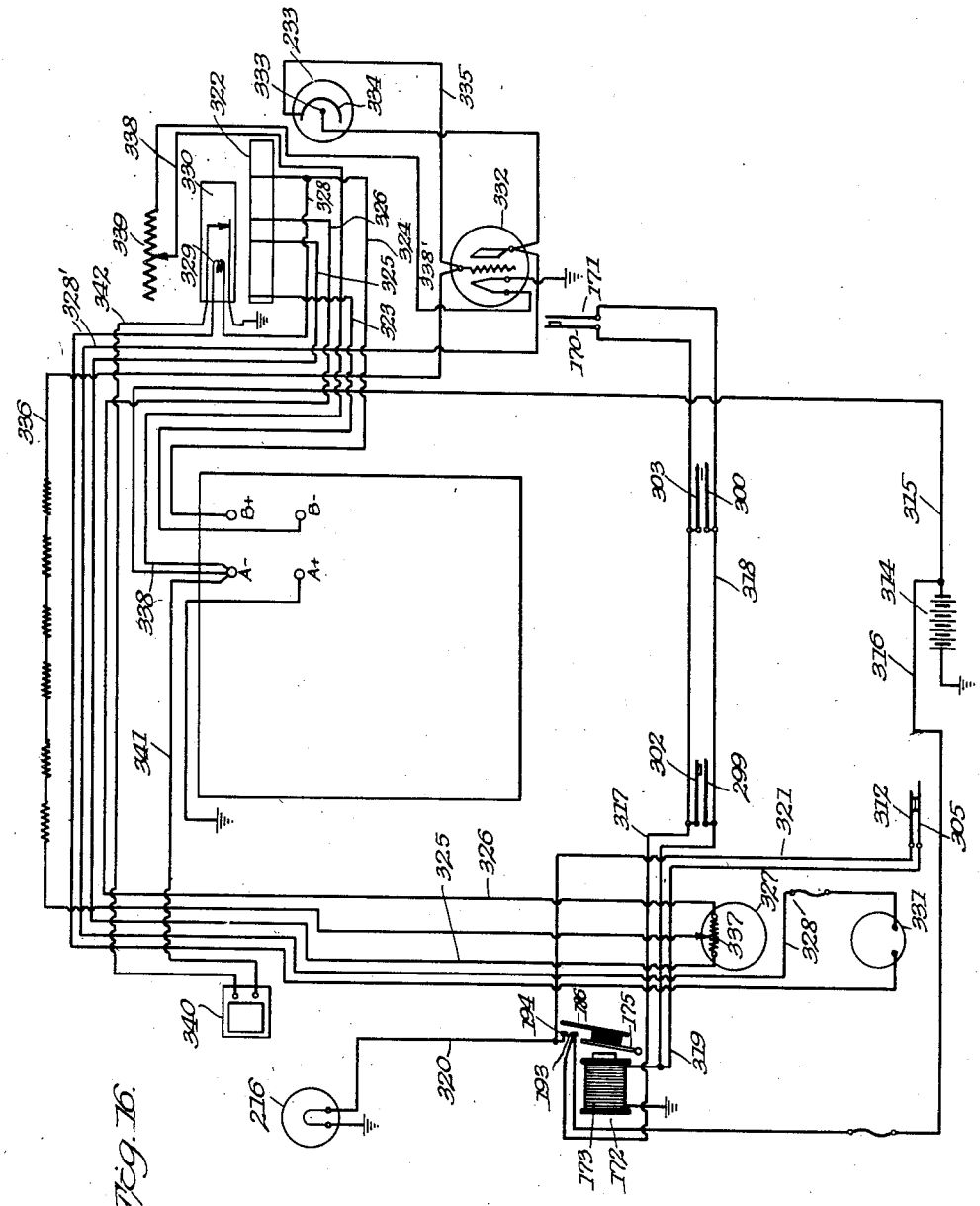

Patented Sept. 1, 1936

2,052,844

UNITED STATES PATENT OFFICE 2,052,844

REGISTERING APPARATUS

Robert Edward Prusso, Livingston, and Ermal William Gaddy, Turlock, Calif., assignors of one-fifth to William Edward Mitchell, one-fifth to Everett Wesley Gaddy, both of Turlock, Calif., and one-fifth to W. Coburn Cook, Markleeville, Calif.

Application March 2, 1934, Serial No. 713,736

40 Claims. (Cl. 177—311)

The present invention relates primarily to a machine adapted, when certain indicia such as numbers are registered therein, to give a signal when any one of the numbers is again entered in the machine. The machine is adapted for the reception therein of various indicia, but ordinarily each machine is designed with reference to some particular indicia which it is to receive.

As illustrative of the invention and in order to make clear the general principles involved, we shall describe hereinafter and with reference to the accompanying drawings, a machine particularly designed to be loaded with the license tag numbers of automotive vehicles, it being assumed that notice of such numbers is desired for some reason, as in the case of stolen cars. In the use of such a machine, the machine has initially registered therein the tag numbers in question. Thereupon, an operator stationed so as to be able to view the tag numbers of vehicles traveling a preferably arterial highway or street enters in the machine the number of each passing vehicle. Should a number be set up corresponding with one of the registered numbers, a signal is given, immediately advising the operator that the number just entered is that of a sought car so that, as in the case of a stolen car, apprehension may follow.

As another example, when it is desired to identify certain bank notes, their numbers may be loaded in the machine, the operator, as in a bank, then entering in the machine the numbers of the notes passing through his hands. For this latter use, however, a machine of relatively large range is required in view of the larger numbers to be handled as compared to license tag numbers. As a matter of convenience, therefore, we have chosen to describe a machine only of sufficient size to handle the ordinary license tag numbers.

In the State of California at the present time, license tag numbers run to no more than six spaces of which five may be numerals and one a letter. By way of example, we have chosen to describe a machine of a capacity designated for such typical indicia, that is, made up of no more than five numerals and a letter. A machine of this capacity must be able to register distinctively a number of less than the maximum number of places as well as full numbers and numbers wherein the same numeral may be repeated any number of times up to five. For this purpose, five separate banks of numeral keys may be provided, but preferably, and as hereinafter described, a single bank or series of keys, 0 to 9, is provided, each individual key being capable of five selections. This latter feature is mentioned particularly since it is of general application and not limited to use in the main machine with which the present invention is concerned.

Briefly, the main machine comprises number and letter keys actuatable to swing shield plates from a limit position in which the plates are normally at rest to a limit operated position. For the purpose of registering a number in the machine, the proper keys are depressed, thus moving the associated plates from normal to operated position. The plates which are initially imperforate are provided with aligned apertures while in this limit position and thereupon are returned to normal position by suitable clearing means. When the same keys are again depressed, again swinging the same plates to their limit positions, the apertures are again in alignment and a source of light at one side of the series of plates is adapted to activate, through the aligned openings, a photo-electric cell at the other side of the series of plates, the cell being arranged to cause a signal to be given. The machine to be described is designed to have several hundred numbers thus registered therein and when any one of them is again set up, a signal will be given, whereas when any number is set up which has not been previously registered in the machine, no signal is possible. The movable plates constitute carrying means for a multiplicity of given individual data (herein numbers), each datum having a plurality of components in certain order and the various data having different components or components in common but in different arrangement or association. A key is provided for each possible component and when the keys are operated to repeat a datum which has been previously set up on the carrying means, a signal results. Since the invention can be best understood from a specific description of the apparatus, we shall proceed to describe it with reference to the embodiment shown in the drawings, this embodiment, it is again emphasized, being shown merely by way of example. In the drawings, Figure 1 is a plan view of the machine as a whole with parts broken away;

Figure 2 is a section substantially on line 2—2 of Figure 1;

Figure 3 is a section substantially on line 3—3 of Figure 1;

Figure 4 is a section substantially on line 4—4 of Figure 3;

Figure 5 is a section substantially on line 5—5 of Figure 3;

Figure 9:
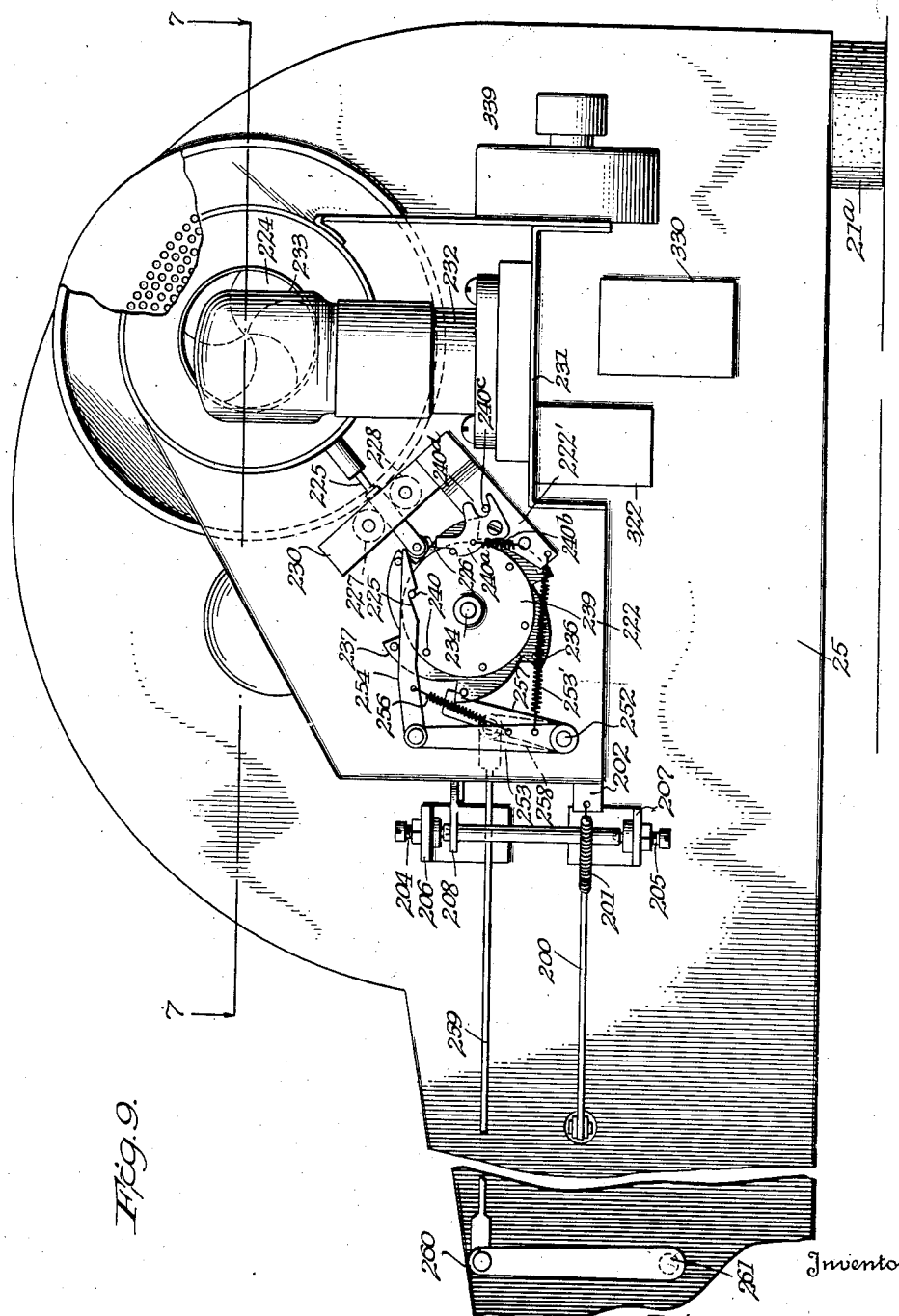

Figure 6 is a section substantially on line 6—6 of Figure 3;
Figure 7 is a section substantially on line 7—7 of Figure 9;
Figure 8 is a section substantially on line 8—8 of Figure 2;
Figure 9 is an end elevation of the machine with parts removed to reveal others;
Figure 10 is a section substantially on line 10—10 of Figure 3;
Figure 11 is a section substantially on line 11—11 of Figure 3;
Figure 12 is a section substantially on line 12—12 of Figure 6;
Figure 13 is a section substantially on line 13—13 of Figure 6;
Figure 14 is a plan view of one of the above mentioned shield plates;
Figure 15 is a section substantially on line 15—15 of Figure 14; and
Figure 16 is a diagram showing a suitable circuit arrangement for certain electrically operated apparatus of the machine.

Refering to the drawings, and particularly to Figures 1 and 2, the machine comprises a casing generally designated by the reference numeral 20, this casing being made up of a rectangular bottom plate 21, a front plate 22, a rear plate 23, side plates 24 and 25, and top plates 26 and 27. For the support of the machine, cushion feet as at 21a may be secured to the lower side of plate 21. The outlines of the side plates may be clearly seen in Figure 2, from which figure it will be noted that the forward portion of these plates is rearwardly and upwardly inclined to rear, upwardly projecting substantially semi-circular portions. The top plate 27 is flush with the upper edges of the inclined portions of the side plates and at its upper end is supported on a bar 28 which extends between the side plates and is secured thereto. The top plate 26 conforms to the semi-circular edges of the rear portion of the side plates and is supported therebetween, its forward edge projecting into a groove 28' in bar 28 immediately behind the upper edge of plate 27. A shaft 29 extends between the side plates for support thereby in substantially concentric relation to the curve of the semi-circular side plate portions. To the rear of shaft 29, bars 30 and 31 extend between the side plates with their upper faces in the same plane, the side plates forwardly of shaft 29 being similarly connected by a bar 32.

Referring also to Figures 3, 6 and 7, a frame, or block, generally designated by the reference numeral 33, consists of a series of segment shaped plates 34 pierced adjacent the apices and strung on shaft 29. The plates 34 are suitably interconnected in uniformly spaced relation by spacer strips or plates as at 34' and the frame thereby constituted extends substantially from side to side of the machine, rests on bars 30 and 31, and is fixedly secured in this position. Each plate 34 is provided with a multiplicity of perforations 35, those of each plate being in register with those of the other plates and also with perforations 24' and 25' formed in the side plates 24 and 25, Figure 7.

A series of segment-shaped shield plates 36, Figures 1, 2, 3, 6 and 7, is strung on shaft 29 in alternating relation to the plates 34 so as to be able to swing from a normal or rest position in which their outer ends are supported by bar 32 to an operated limit position in which they are disposed between the plates 34 and rest on strips 34' in blocking relation to all of the apertures 35 in the latter. The plates 36 have a somewhat smaller radial dimension than plates 34 and thus clear the tie rod 37 which connects the side plates 24 and 25 adjacent the tops of the latter. As shown in the figures just mentioned, plates 36 are constituted by metal plates provided with perforations adapted to register with perforations 35 of the fixed plates 34, the perforations of the shield plates being initially filled with some readily melted material. As clearly shown in Figure 3, each plate 36 is provided with an aperture 39 of a size to receive freely shaft 29 and at its apex with a rounded heel portion 40 and an opposite straight portion 40'.

A modified form of a shield plate 36' is shown in Figures 14 and 15, each of these plates comprising a metal frame 38 of substantially segmental form and provided with an aperture 39' of a size to receive freely shaft 29. Between its diverging arms frame 38 supports a sheet 41 of cardboard or the like, the cardboard being engaged in the frame in the manner shown in Figure 15. The outer edge of the cardboard is similarly engaged in an arcuate frame portion 38'.

Ordinarily all of the plates 36 rest on bar 32. By means of keys and certain related mechanism, selected ones of the plates may be thrown to a position in which they lie within frame 33. The position of plates 36 may be viewed by the operator through a transparent panel 26' in the forward side of cover plate 26.

For the purpose of selecting the proper plates 36, there is provided a keyboard comprising a transverse series of number keys 42 and three rows of letter keys 43, the number keys bearing the numbers 0 to 9. A full quota of letter keys is provided, except, as here shown, the letter keys I, O, and Q, which are replaced by keys bearing the numerals 1, 2 and 3, these keys being hereinafter referred to as blocking keys. It will be understood that the blocking keys may have any other desired arrangement on the keyboard, but preferably the normal typewriter key arrangement is retained with as little change as possible. The number keys 42 are arranged on the upper ends of stems as at 44, Figure 2, which project downwardly through suitable comb plates arranged in an opening 27' in plate 27 and form parts of key levers 45. The letter keys 43 are similarly arranged on stems 46 forming parts of levers 47. Levers 47 are pivoted in suitably spaced relation on a rod 48 supported beneath bar 28 and have their inner extremities flattened to lie in a horizontal plane and bifurcated, Figures 2, 3 and 6. As may be seen from Figure 6, rod 48 is secured to the side plates and has strung thereon spacer blocks 49 for the levers 47. Each lever 47 is fixed in a kerf in an associated block 49 and thus has ample bearing surface on rod 48. Bar 28 is provided with a vertical bore immediately above each lever 47, the lower end of each bore receiving a compression spring 50 which, at its lower end, rests on a lever 47 and at its upper end bears against an adjustable abutment screw 51.

Referring particularly to Figures 3, 5 and 6, each lever 45 is provided with a downwardly bowed portion clearing the spacer blocks 49, the inner extremity of the lever then being directed upwardly and rearwardly and provided with a barrel portion 52 secured thereto and pivotally engaging a rod 53 extending between the casing side walls. The barrels are held against axial displacement on rod 53 by means of stop collars as at 54, Figure 6. Fixed to each barrel and constituting a part of each lever 45 is a downwardly extending finger 55 and each lever 45 forwardly of shaft 53 is connected with bar 32 by means of a tension spring 45'. The arrangement of fingers 55 on the barrels is such that they are uniformly spaced along rod 53.

Each of levers 45 and 47 is guided in a comb plate 56 mounted on a cross bar 57, the latter having also mounted thereon a yoke 58 having a horizontal portion extending above all of the levers and covered with yielding material 59 to limit upward movement of the levers. A pair of arms 60 and 61, Figures 2 and 8, rigidly secured beneath bar 57 and projecting toward front plate 22 support three yokes 62, 63 and 64 which have padded cross portions 65, 66 and 67 providing downward stops for the three rows of letter key levers, a similar yoke 68 being mounted on bar 57 for cooperation with the number key levers.

From the above, it will be understood that all of the key levers are normally held in the position shown in Figure 2. Upon depression of a number key, the finger portion 55 there is given movement toward the rear of the machine, while on depression of a letter key, its inner extremity is swung upwardly.

Directly beneath the inner ends of levers 47, a bar 69 is fixed between the side walls of the casing, Figures 2 and 3, this bar being provided with a vertical bore 70 beneath each lever and each intersecting a counterbore 71. An angle strip 72 secured to bar 69 has a horizontal top flange 72' above bar 69 and is provided with bores in alignment with bores 70. A stop member in the form of a pin 73 is vertically slidable in each of bores 70 and has its upper end extending through and provided with a head 73' somewhat above the flange 72' with the lower end of the pin normally blocking counterbore 71. A compression spring interposed between said flange 72' and an abutment 75 on pin 73 normally holds the latter in the position shown in Figure 3. The inner bifurcated ends of levers 47 normally lie against the top flange of member 72, each engaging a pin 73 below the head 73' thereof.

Slidable in each counterbore 71 is one end of a rod 76 whose other upwardly offset end is slidably supported on a bar 77 extending across the rear portion of the casing. Fixed on the rear end of each rod 76 is an upstanding substantially rectangular plate 78 which, in the rest position of the bars, has a front edge in substantial engagement with the curved heel portion 40 of a shield plate 36. In this position of parts, the forward end of rod 76 abuts pin 73, as shown in Figure 3. An anchor plate 79 is secured against the lower face of bar 69 and has secured thereto the ends of tension springs 80, which at their other ends are secured to rods 76 through downwardly projecting ears 81.

A cross bar 82 is spaced somewhat rearwardly of the lower end of fingers 55 and secured between the casing side walls. Bar 82 is provided, as here shown, with fifty vertical bores 83 which are in alignment with bores formed in the horizontal upwardly spaced flange 84 of an angle strip 85 secured to bar 82. A counterbore 86 intersects the lower end of each bore 83 and slidable in each bore 83 with its upper end guided in the flange 84 is a pin 87. Passed through each pin 87 in parallel relation to the casing side walls is a pin 88 which has a substantial projection forwardly and rearwardly of the pin 87. A compression spring 89 is interposed between pin 88 and flange 84 so that each pin 87 is normally yieldingly held in the position shown in Figure 3. The rearwardly projecting portion of each pin 88 is engaged between a pair of posts 90, Figures 2, 3 and 6, these posts having their lower ends fixed in vertical bores in bar 82 and serving to hold pins 88 against any appreciable movement about the axis of their associated pins 87.

Rods 91 have their forward ends disposed normally in the rear portions of counterbores 86 in abutment with the lower ends of pins 87, the rearward ends of rods 91 being slidable on bar 77 and having fixed thereon upstanding plates 92 exactly the same as plates 78 heretofore mentioned and each in substantial engagement with the curved heel portion 40 of a shield plate 36. Upward movement of plates 78 and 92 is prevented by bar 31 which, as shown in Figure 3, has a beveled portion immediately overlying the upper edges of the plates. Rods 91 are continued a substantial distance beyond the associated plates 92 and have downwardly turned extremities to which are connected tension springs 93 which at their other ends are connected to an anchor plate 94 on bar 77.

From the above, it will be understood that in the rest position of the parts, rods 76 and 91 are blocked in the positions shown in Figure 3 by means of pins 73 and 87, the plates 78 and 92 associated with rods 76 and 91, respectively, being in substantial engagement with the curved heel portions 40 of plates 36 which are in their normal position wherein their upper ends are supported on bar 32. Preferably, bar 32 has a facing pad 32' on which the edges of plates 36 rest. It will be seen from Figure 6 that the rear portions of rods 76 are also somewhat laterally offset for the sake of proper clearance.

Bar 82 has fixed to its forward face an elongated block 95 provided on its forward face with a horizontal groove 96. Horizontal members as at 97 projecting forwardly of bar 82 support an elongated block 98 in parallel relation to block 95 and provided with a horizontal groove 99, groove 99 being parallel to groove 96 and lying in the same horizontal plane. An elongated slide or carriage 100 is provided with grooves 101 and 102 on its opposite edges in registering relation with grooves 99 and 96, the opposed pairs of grooves receiving balls 103 and 104 adapting the slide for guided longitudinal movement relative to members 98 and 96 with a minimum of friction.

A shaft 105, Figures 3 and 4 in particular, is supported at its ends by means of uprights 106 and 107 at the ends of slide 100, the shaft being held against longitudinal displacement by means of stop collars 108 and 109 on the opposite sides of upright 106. Strung on shaft 105 are ten selector members or intermediate levers 110, one associated with each of the number key levers. Each of these levers includes a barrel portion 111 oscillatable on rod 105 and a longitudinally expanded downwardly projecting arm portion 112, and has at its extreme right hand end, Figure 6, a finger 113 which projects rearwardly from an elongated web 114. The fingers 113 are uniformly spaced along shaft 105. A horizontal rod 115 extends in parallel relation to shaft 105 and slightly below the latter, rod 115 having forwardly turned ends secured to the carriage uprights 106 and 107. The arm portion 112 of each intermediate lever 110 has secured to its rear side a leaf spring 116 which engages the underside of rod 115 and thus normally yieldingly holds the finger 113 in engagement with the top of the rod. In the rest position of the machine, the lever 110 at the extreme left, Figure 6, has its finger 113 positioned beneath pin 88 of the first stop pin or member 87. As will be hereinafter explained, the carriage 100 is adapted to be stepped to the right so that each finger 113 comes successively under the next four pins 88 for possible cooperation therewith. The left hand extreme portion of the carriage is determined by a buffer pad 117 adjustably mounted on a bracket 118 in position to be engaged by the end of shaft 105. As most clearly seen in Figures 3 and 4, the number lever fingers 55 have their lower ends positioned immediately adjacent the lower ends of arms 112 of the intermediate levers 110 and each finger 55, due to the longitudinal extent of its associated arm 112, is always in position to engage the latter throughout the range of travel of the carriage 100. The carriage is normally yieldably urged toward the right by means of a tension spring 118 connected at one end to post 106 and at its other end to an arm 119, Figures 3 and 4, projecting from bar 32.

Carriage 100 at its intermediate portion is provided with a series of forwardly faced rack teeth 120, Figures 3 and 4, engaged by a gear 121 which is fixed on a vertical shaft 122 journaled at its upper end in block 98, clearance for the forward portion of gear 121 being provided by a slot 123 in angle strip 72.

The lower end of shaft 122 is angularly grooved to receive rollers 124 and 125 journaled in upright flanges 126 and 127 on a ratchet wheel 128, Figures 3 and 11. The ratchet wheel rests on the horizontal flange 129 of a bracket 130 which is fixed to a block 131 on the floor plate 21. Ratchet 128 is spaced somewhat above flange 129 by means of a collar 132. The ratchet is connected by means of a sleeve journaled in flange 129 with a disc 133 spaced below the latter, the lower extremity of shaft 122 being received in the sleeve. A brake arm 134, Figure 10, pivoted beneath flange 129 is held against disc 133 by means of a leaf spring 135 mounted on the arm and bearing against an adjustable stop 135' on the bracket.

Bracket 130, Figures 3, 5 and 11, has a pair of forwardly and upwardly projecting arms 136 and 137 in which are threaded and locked by means of associated nuts, a pair of pivot pins 138 and 139, whose opposed pointed ends engage bearing recesses formed in the upright arm portions of a yoke 140, said arm portions at their upper ends supporting a cross member 141 to which is bolted a forwardly projecting arm 142. The forward end of arm 142 projects between the legs of a yoke 143 which has a padded cross portion serving to limit upward movement of arm 142. A pin 144 is pivoted to the extremity of arm 142 on an axis parallel to the pivoting axis of yoke 140, the pin extending upwardly and having its end received in an aperture in the extremity of an arm 145 which projects forwardly from a rock shaft 146 pivotally mounted on needle point bearings comprising pins 147 and 148 supported in brackets 149 and 150 on the forward face of bar 69, Figures 3 and 5. An angle strip 151 is supported on arms 152 and 153 projecting forwardly from rock shaft 146, arm 145 being passed through an opening in bar 151, which latter extends directly beneath the downwardly bowed portions of all of levers 45. A compression spring 154 is interposed between the extremities of arms 142 and 145 and surrounds pin 144. The action of the spring is limited by means of an abutment 155 on pin 144 above arm 145.

Yoke 140 has a rearwardly extending arm 156 on which is pivoted a pawl 157 by means of a screw 158. At its offset extremity, Figure 11, arm 156 has pivoted thereto, and therebeneath, a pawl 159, both of these pawls being adapted to cooperate with ratchet 128. Yoke 140 has a forwardly extending arm portion 161 in the extremity of which is formed a slot 162 substantially concentric with pin 158. A finger 163 is pivoted on a screw 164 which passes through slot 162 and which may be fixed in adjusted position therein. The free end of finger 163 has substantially parallel surfaces engaged in a parallely walled slot 165 in the tail portion of pawl 157 with a slight lost motion relation so that limited oscillation of pawl 157 is permitted and the limits of this oscillation may be determined through selective positioning of pivot screw 164 in slot 162. Pawl 159 has fixed thereon an upwardly extending pin 166 which is adapted to abut a portion 167 on arm 156 to limit the movement of its nose portion toward the ratchet and pin 166 is connected with the tail portion of pawl 157 by means of a tension spring 168.

Pawl 157 is normally engaged with a tooth of ratchet 128, the ratchet tending to rotate in a clockwise direction, Figure 11, due to the action of spring 118, whose effect is transmitted through the rack teeth 120 on the slide, gear 121, and shaft 122. Due to this rotative tendency of the ratchet, pawl 157 is held in its limit position of counter-clockwise rotation as determined by the finger 163 and in this position, its operative face is substantially in the same vertical plane as the operative extremity of the nose portion of pawl 159. If arm 142 is depressed, thus rocking yoke 140 and the associated pawls, the nose of pawl 157 is moved to a position above the ratchet tooth which it has just engaged but not until the nose of pawl 159 has come in front of the same tooth so that no rotation of ratchet 128 and consequent movement of slide 100 is permitted. As pawl 157 is moved upwardly, as just described, to release a tooth, spring 168 acts to swing the pawl in a clockwise direction so that its nose comes to a position above and behind the tooth which it has just engaged and above and in front of the succeeding tooth. If arm 142 is now permitted to swing upwardly, the arm 156 of yoke 140 swings downwardly, the nose of pawl 159 is moved below the tooth with which it has just been in engagement to free the same and at the same time the nose of pawl 157 is moved in front of the succeeding tooth. Hereupon, ratchet wheel 128 is rotated in clockwise direction through the action of spring 118 until it is brought to a stop by pawl 157 as the latter reaches its limit of movement in counter-clockwise direction, the pawls now being in their original rest position in which they are yieldingly held by means of a torsion spring 169 surrounding the outer end portion of pivot pin 139 and anchored at one end to the latter and at the other to the adjacent arm of yoke 140. The rear sides of the ratchet teeth are preferably beveled, as shown in Figure 3, to facilitate the commutating action of the pawls. The described rotational step of ratchet wheel 128 has permitted slide 100 to advance one step to the right, Figures 4 and 6. It being understood that fingers 113 of intermediate levers 110 are each associated with five of the stop pins 87, the step to the right permitted by the mechanism just described will bring each finger under the succeeding pin 88 of its associated group. Succeeding steps will bring the fingers under the succeeding pins 88 up to the final and fifth pin.

At its right hand limit of movement, Figure 4, the slide upright 107 abuts a spring contact finger 170, see also Figure 16, moving it against a fixed contact finger 171 and closing a circuit, to be more particularly described hereinafter, up to a relay 172, Figures 6, 12 and 13. The relay includes a coil 173 and a core 174 in front of which is disposed an armature 175 which is floatingly supported by means of slots in its sides engaging spaced projections at the ends of a leg 176' of a bracket 176, the lower extremity of the armature resting against a wall 177' of a yoke 177 secured to leg 176' and being yieldingly held against said wall by means of a compression spring 178.

The spring 178, influencing the armature below its pivoting axis, normally holds the upper portion of the armature away from core 174, as particularly shown in Figure 12. Armature 175 has an insulating backing 179 affixed thereto and through which projects a stud 180, likewise secured to the armature, the stud being surrounded by an insulating sheath 181. An arm 182 has an apertured hub portion 183 of insulating material received on the end of stud 180 and clamped against sheathing 181 by means of a nut 184. In order to prevent arm 182 from turning about stud 180, its lower extremity is engaged by a pin 185 which is fixed at one end in the insulating backing 179. A contact plate 186 is apertured to receive the insulating sheath 181 and is slidable thereon. The lower end of the plate is also apertured and provided with an insulating bushing 187 which is slidable on pin 185, the lower extremity of the plate being formed as a finger bent in the direction of the insulating block 179 and received in an aperture 188 therein, all of these provisions serving to maintain plate 186 in the upright position shown. A compression spring 189 surrounding sheath 181 abuts hub 183 with one end and plate 180 with the other and holds the latter normally against insulating backing 179.

At its upper end, plate 186 is bifurcated to present a pair of contact fingers 190 and 191. Arranged on an insulating block 192 on an upper leg of bracket 176 are a pair of fixed contacts 193 and 194 in connection with terminal screws 195 and 196 and separated by a shield plate 197 of insulating material. The upper end of arm 182 is provided with an aperture in which is slidably engaged one end of a pull rod 198 which has a head 199 on the inner side of arm 182. The other end of pull rod 198 extends through an aperature in the casing side wall 25 and is connected to one arm of a bell crank lever 200, the same arm of this lever being connected by means of tension spring 201 with a lug 202 on a vertical wall 203 of an extension frame secured to the outer side of wall 25 of the main casing so that head 199 is held against arm 182 and the movement of the pull rod under the influence of spring 201 thereby limited. The bell crank lever 200, Figures 7 and 9, comprises a vertical shaft portion pivoted between screws 204 and 205 secured in brackets 206 and 207 fixed to wall 25 of the machine casing. The other arm 208 of the bell crank lever 200 normally projects slightly within wall 203 through an opening therefor provided and has pivotally mounted thereon on a vertical axis a pawl 209 which is pulled in a counterclockwise direction by means of a tension spring 210 connected between a tail portion of the pawl and a lug 211 on arm 208. Rotation of pawl 209 under the influence of spring 210 is limited by abutment of the tail portion of the pawl with a pin 212 on arm 208.

Referring particularly to Figures 1 and 7, a cylindrical collar 213 fixed to casing side wall 24 in surrounding relation to perforations 24' has hinged thereto a reflector housing 214 which carries a parabolic reflector 215, a bulb 216 and a transparent closure plate 217. The reflector housing 214 is adapted to be held in operative position by means of a thumb nut 218 in well known manner. Collar 213 has a translucent insert 219 by means of which the operation of the bulb may be observed.

A cylindrical collar 220 is secured to casing side wall 25 in surrounding relation to perforations 25' and supports a plano-convex lens 221. A free space exists between lens 221 and an end wall 222 of the extension frame. Quick acting shutter mechanism 223 is secured to the outer side of wall 222, which latter is provided with an aperture registering with the shutter opening. The shutter mechanism, which may be of any suitable construction, includes a shutter 224 and an actuating plunger 225 which carries a roller 226 at its extremity, the plunger being guided between a pair of rollers 227 and 228 journaled between a pair of strips 229 and 230 fixed to the wall 222, Figures 7 and 9. A shelf 231 fixed on the outer side of wall 222 supports a socket 232 in which is engaged a photo-electric tube 233 in register with the shutter opening.

A spindle 234 mounted in wall 222 and the parallel wall 235 of a bracket secured to the outer face of wall 222 has rotatably mounted thereon a wheel 236 provided with peripheral cams 237 which cooperate with roller 226 of the shutter actuating plunger 225. Wheel 236 is intended to rotate in an anti-clockwise direction and each cam surface has a relatively gradual arcuate shaped cam rise terminating in an abrupt drop. A pin 238 is fixed in each cam element, these pins being uniformly spaced and projecting toward wall 222.

Also journaled on spindle 234 is a disc 239 to which are secured, near the periphery of the disc, a series of pins 240 projecting toward wall 235. Wheel 236 and disc 239 are connected by means of a torsion spring 241 surrounding spindle 234, the spacing of the discs on the spindle being maintained by suitable collars, of which the end ones are shown at 242 and 243.

A bell crank lever 244 is pivotally supported on a vertical axis on a plate 245 secured in the corner between walls 203 and 222. One arm 246 of lever 244 has its terminal portion bent substantially at right angles and projecting through an opening in wall 222 and into the path of pins 238, one of the pins normally abutting the extremity of arm 246 to hold wheel 236 against rotation. The other arm of lever 244 has its extremity bent at substantially right angles and extending through the opening in wall 203 provided for lever arm 208 and provided with a recess 247 having at its outer end a cam surface adapted to be engaged by the nose of pawl 209. Lever 244 is yieldingly held in the position shown in Figure 7 by means of a tension spring 249 extending between an arm of the lever and a fixed arm 248 on wall 222, the action of the spring being limited by a stop 250 on wall 222 in position to be engaged by the other arm 246 of the lever.

Journaled in a bearing provided in wall 222 and in a bracket 251 secured to the inner face of wall 203 is a rock shaft 252 which projects outwardly beyond wall 222. At its outer end, shaft 252 has secured thereto an upright arm 253, to the other end of which is pivotally connected a latch 254 on an axis parallel to shaft 252. Latch 254 is in the plane of pins 240 and is provided on its underside with a notch 255 adapted to engage one of said pins. Finger 254 is yieldingly pulled downwardly by means of a tension spring 256 which is connected between it and the arm 253. Fixed to shaft 252 in the plane of teeth 238, but to one side of the extremity of lever arm 246, Figure 7, is an upwardly extending arm 257 whose upper end normally projects slightly within the rotational path of pins 238 at a point slightly above the end of lever arm 246. A tension spring 253' is connected between arm 253 and a bracket 222' on wall 222 and takes up any play in the linkage to assure that latch 254 will normally be held in its extreme right hand position, Figure 9, so that a pin 240 will always be properly engaged in notch 255. This spring also assures the proper limit positioning of arm 257 whose upper end normally projects only to a slight extent into the path of pins 238. A dog 240a, pivoted on bracket 222', normally engages a pin 240 to hold disc 239 against retrograde movement under the action of torsion spring 241. The dog is yieldingly urged toward the pins by a tension spring 240b, its range of movement being limited by a pin 240c fixed on bracket 222' and extending into a recess 240d in the dog. The inner end of shaft 252 has fixed thereon an upstanding arm 258 to the upper end of which is pivotally connected one end of a link 259 which extends outwardly through wall 203 and along casing wall 25 to the upper end of an arm 260 fixed on the outwardly projecting end of a rock shaft 261 which, within the machine, is journaled in the fixed arms 60 and 61.

Fixed to shaft 261 at the ends of the keyboard are a pair of forwardly extending arms in the form of socket elements 262 and 263 adapted to receive the shank portions 264 and 265 of a hand bar 266 at the front end of the machine, the said shank portions being passed through slots as at 267, Figure 2, in the front casing wall 22. Beneath a lug on arm 263 is disposed a compression spring 268 which, at its lower end, bears against the seat 269 on bottom plate 21, any suitable stop means being provided to limit the effect of the spring. A rearwardly extending arm 270 rigidly fixed on shaft 261, has at its rear extremity a slot 271 in which is engaged a pin 272 on an arm 273 which is fixed to a rock shaft 274 extending between the casing side walls. Adjacent its ends, shaft 274 has fixed thereon upwardly and rearwardly extending arms 275 and 276, Figures 2, 4, 6 and 7, which have slotted extremities engaging a bar 277 which normally occupies a position immediately in front of the straight heel portions 40' of plates 36 when the latter are in the dotted line actuated position shown in Figure 3. Bar 277 has its ends secured in arms 278, Figures 2, 3 and 7, which at their other ends have apertures freely receiving shaft 29 at the ends of frame 33. Bar 277 is thus revoluble about shaft 29.

Shaft 274 also has fixed thereto a downwardly extending arm 279 which is yieldingly pulled rearwardly by means of a tension spring 280 connected thereto and to a post 281 projecting downwardly from bar 77, Figure 3. A vertical rock shaft 282 pivotally engaged at its ends by points 283 and 284 in a bracket 285 has secured thereto a sickle shaped arm 286 which is engageable by arm 279 upon rocking shaft 274 in a clockwise direction, Figure 3, to rock shaft 282 in clockwise direction, Figure 6. At its top, shaft 282 has fixed thereto a forwardly projecting arm 287 which has a bifurcated end in which the slide upright 106 is freely engaged, Figure 6.

Arm 270 has fixed thereon a cam block 288, Figures 2 and 4. A block 289, fixed to bottom plate 21, between arm 270 and yoke 143 pivotally supports an upwardly extending finger 290, the pivoting axis of the finger being parallel to the vertical plane of arm 270. Finger 290 is urged toward cam block 288 by means of a compression spring 291, the action of the spring being limited by a stop in the form of a lock screw 292. At its upper end, finger 290 pivotally supports a lever 293 on an axis parallel to its own pivoting axis. At its right hand end, Figure 5, lever 293 rotatably supports a roller 294 which is engageable by cam block 288 when arm 270 is elevated upon depression of the hand bar 266. Lever 293 has a tail portion extending above an arm 142' fixed to and extending below the outer end of the arm 142, Figure 3.

It will be noted that roller 294 projects somewhat into and above the path of cam block 288, the adjacent upper edge of the latter being preferably somewhat bevelled as shown in Figure 5. When the cam block strikes the roller, lever 293 and finger 290 are moved somewhat to the left, Figure 5, and the tail of the lever is depressed, engaging arm 142' and rocking yoke 140 in a counter-clockwise direction, Figure 3, so that pawl 159 is moved into operative position relative to ratchet 128.

The blocking keys 1, 2 and 3, hereinabove referred to, have downwardly extending stem portions 295, 296 and 297 respectively, Figure 8. An insulating slab 298 is supported between arms 60 and 61, Figure 8, and supports a fixed contact finger 299 beneath stem 295 and a fixed finger 300 beneath stems 296 and 297. An insulating block 301 on top of slab 298 has fixed thereto spring contact fingers 302 and 303 overlying the fixed contact fingers 299 and 300, respectively, and the pair of switches thus constituted are normally open, as shown in Figure 8.

On an insulating block 304 is mounted a spring contact finger 305 which has secured to its free end a projecting insulating plate 306 disposed beneath a clip 307 mounted on block 304 immediately beneath a lug 308 on arm 262, a compression spring 309 being interposed between lug 308 and the insulating plate 306 and passing through an aperture 310 in strip 307. Mounted on an insulating strip 311 which overlies the rear portion of contact strip 305 is a fixed contact finger 312 backed by a rigid insulating plate 313. With lever arm 262 in the normal position shown, the switch constituted by strips 305 and 312 is closed.

Since in the particular use of the machine described, house current is ordinarily not available, all of the electrical devices are preferably adapted to be operated from an ordinary 6 volt automobile battery. While in Figure 16 we have included such a battery in the diagram, the battery being designated by the reference numeral 314, it will be understood that ordinarily a socket will be provided in the wall of the machine to receive a conductor plug associated with a conductor leading from a battery.

Referring to Figure 16, the positive side of battery 314 is grounded and the negative side is connected through a conductor 315 with the terminal A— of a "B" eliminator. A conductor 316 leads from the conductor 315 to contact 193 of relay 172 and a conductor 317 leads from this contact to the spring contact finger 170 of the switch 170, 171, the fixed portion 171 of the latter being in connection through a conductor 318 with a conductor 319 which is in connection with one end of coil 173, the other end of the coil being grounded. Switches 299 and 300 are arranged across conductors 317 and 318.

A conductor 320 leads from relay contact 194 to one end of the filament of bulb 216, the other end of the filament being grounded. Conductor 319 leads to the spring contact finger 305, the fixed contact finger 312 being in connection with conductor 320 through a conductor 321.

The terminal A+ of the "B" eliminator is grounded. Terminals B+ and B— are led to a 30,000 ohm resistor 322 through conductors 323 and 324 whence "C" leads 325 and 326 extend to a potentiometer 327 which may be conveniently disposed in the casing plate 27, Figure 1. When light strikes the photo-electric cell 233 current flows from the terminal B+ of the "B" eliminator through conductor 324, a conductor 328, the coil 329 of a relay 330, a conductor 328' and a milliammeter 331, arranged in casing plate 27, Figure 1, to the plate of an amplifying tube 332 and the anode 333 of the photo-electric cell 233. From this point the flow is through the cell, which includes the cathode 334, a conductor 335, the grid of tube 332, a grid resistance 336 to the point 337 of the potentiometer 327. A filament circuit extends from terminal A— of the "B" eliminator through a conductor 338, a rheostat 339, and a conductor 338' to the filament and thence to a ground. Finally, a buzzer or other signalling device 340 is in connection with terminal A— of the "B" eliminator through a conductor 340, and through a conductor 342 and relay 330 to a ground.

The "B" eliminator is of a flat type adapted to rest on the bottom plate of the machine casing beneath the frame 33 and the disposition of the amplifying tube 332 is shown in Figure 7, the relay 330 being shown in Figure 9 as is also the 30,000 ohm resistor 322. The rheostat 339 is also shown in Figure 9 and the resistance 336 may be conveniently made up of a number of units arranged in series in a glass tube mounted in the casing at the rear of the machine. All the elements outside of casing wall 25 are enclosed in a casing extension 29'.

If, for example, the number 8M8496 is to be registered in the machine, the number key 8 is depressed, it being understood that carriage 100 is in its extreme left hand position as shown in Figure 6. Upon depression of the number key its associated lever is swung about shaft 53 and its depending extremity 55 strikes the expanded arm 112 of its associated selector member or intermediate lever 110 causing the lever 110 to rock in counter-clockwise direction so that finger 113 of the lever rises under pin 88 and thus lifts stop pin 87. As the stop pin rises the inner end of its associated rod 91 is released and the rod is instantaneously moved toward the front of the machine through its associated spring 93. The plate 92 on rod 91 being engaged behind the heel portion 40 of the plate 36 moves the same from its full line position, Figure 3, to the dotted line position wherein it lies in frame 33 between a pair of perforated plates 34. Depression of the key has also caused depression of bar 151, Figure 3, and arm 145, and the latter acting through spring 154 and arm 142 rocks the yoke 140 in a counter-clockwise direction about its axis so that pawl 157 moves upwardly to free the engaged tooth of ratchet 128 and pawl 159 comes in front of the same tooth without permitting any rotation of the ratchet. However, as soon as the number 8 key is released, permitting arm 145 to assume its normal position, yoke 140 is likewise returned to its normal position and ratchet 128 is permitted to rotate one tooth in the manner previously explained so that finger 113 now rests beneath the second pin 88 of its associated group of five stop pins 87.

The letter key M is now depressed, its associated lever 47 acting to lift a stop pin 73 so as to permit the associated rod 76 to move forward under the influence of spring 80 so that another shield plate is moved into frame 33 in the manner above mentioned. This operation does not affect the position of the slide 100.

The number 8 key is again depressed and lifts the second of its associated group of stop pins 87, causing another shield plate to be moved into the frame. When the key is released the carriage again advances one step.

The 4, 9 and 6 keys are now pressed in succession, in each instance causing another shield plate to be moved into the frame and in each instance causing a one step advance of the carriage upon release of the depressed key. There are now six shield plates 36 in frame 33. The reflector housing 214 being swung out, a heated rod or wire is inserted in a perforation 24' and run through the aligned perforations in plates 36, thus forming aligned perforations in the six shield plates 36 which are in frame 33. Thus a through opening is provided from side to side of the machine so that light from bulb 216 may pass through to the lens 221. Since there may be several hundred perforations 24', 25' and 35, several hundred different numbers may be similarly registered or loaded in the machine. Desirably a puncturable and renewable sheet 345 is secured to the inner side of plate 24 in covering relation to perforations 24' as a means of indicating, through the perforations appearing therein, those of perforations 24' which have already been used.

Assuming that in the subsequent operation of the machine the number 8M8496 is entered by the operator, as the number 6 key is released and the slide is stepped to the right, it abuts the spring contact finger 170, moving it against the fixed finger 171 and closing a circuit up to coil 173 of relay 172 so that the latter is energized and attracts armature 175. The movement of the armature causes plate 186 to bridge contacts 193 and 194 so that a circuit is now completed to bulb 216 and at the same time a holding circuit for the armature is completed by means of conductors 319 and 321 through switch 305, 312. Movement of the armature 175 has also drawn pull rod 198 to the right, thus rocking bell crank lever 200 which in turn, through pawl 209, rocks bell crank lever 244 in a counter-clockwise direction, withdrawing the extremity of arm 246 from beneath the pin 238 resting thereon. Hereupon cam wheel 236 is rotated in a counter-clockwise direction, Figure 9, under the influence of spring 241, and while bell crank lever 244 immediately returns to its original position, in the path of the next pin 238, the latter strikes the top surface of arm 257 so that rotation of the cam wheel is arrested with roller 226 substantially at the peak of the cam rise, shutter 224 being thus opened. Since the number just entered is one of those originally set up in the machine, a light ray will traverse the frame and the aligned apertures of the shield plates 36 therein. Whatever the position of this ray with respect to lens 221 it will be refracted by the latter so as to pass through the shutter opening and affect the cell so that relay 330 is operated and a signal is given by buzzer 340. A forward circuit for the cell is shown.

If, on the other hand, the number just entered is not one which has been initially registered in the machine, no light is permitted to pass through frame 33 due to the fact that the movable shield plates therein have no apertures in alignment. When the machine is to be cleared the operator presses on the hand bar 266 so that the shaft 261 is rocked in a clockwise direction, spring 268 being compressed. Hereupon, spring 309, Figure 8, acts to move contact finger 305 downwardly to break the circuit to relay 172 and bulb 216, Figure 16. The armature being released, rod 198 moves to the right under the force of spring 201 and pawl 209 rides into normal position in recess 247 of bell crank lever 244. Simultaneously shaft 252, Figure 9, has been rocked through arm 260, link 259 and arm 258, see also Figure 7, thus moving arm 257 from beneath the engaged pin 238 and permitting the latter to come to rest on the extremity of arm 246 of bell crank lever 244. At the same instant roller 226 snaps off of the engaged cam 237 and shutter 224, through its spring, is instantaneously closed. This is desirable since, as will be described, the movable shield plates are simultaneously being moved out of frame 33 and due to the lag of lamp 216 light might reach the cell 233 were it not for the quick actuation of the shutter.

As arm 270 rises, cam block 288, Figure 5, swings lever 293 to rock yoke 140 in the manner heretofore described so that the ratchet wheel 128 is engaged by the spring-pressed pawl 159, Figure 3. Shaft 274 is rocked in a counter-clockwise direction and thus forces bar 277 to move in a clockwise direction about shaft 29, Figure 2, thus returning all the actuated shield plates to their normal position wherein they rest on bar 32. As the shield plates move to normal position their heel portions cam the plates 78 and 92 rearwardly so that rods 76 and 91 are carried rearwardly until stop pins 73 and 87 again come into blocking relation thereto. In the meantime arm 279, Figure 3, has swung arm 286 so that arm 287, Figure 6, is swung to return slide 100 to its left hand limit position, pawl 159 in the meantime riding freely over the teeth of ratchet 128. As slide 100 reaches its left hand limit position, the roller 294 rides off of the lower edge of cam block 288 and the consequent movement of lever 293 releases arm 142' for upward movement, yoke 140 thereupon swinging in a counter-clockwise direction so that pawl 157 immediately engages in front of a tooth of ratchet 128. Downward movement of cam block 288 again causes a movement of lever 293 but without any operative effect on yoke 140.

The rocking of shaft 252, in addition to moving arm 257 in the manner above described, also causes arm 253 to swing toward the front of the machine, Figure 9, carrying latch 254 so that disc 239 is rotated in a counter-clockwise direction, winding the torsion spring 241. As pawl 254 completes its stroke the dog 240a engages behind the succeeding pin 240 on disc 239.

Upon release of the hand bar 266 all the parts thereby actuated are returned to the normal positions illustrated by means of their associated springs.

In describing the operation of the machine as above, it has been assumed that a six place number has been registered in the machine and again entered in the subsequent operation of the machine. In the case of a number of less than six places it is evident that the slide 100 will not reach its right hand limit position so as to close switch 170, 171, since the slide is stepped to the right from its initial position only by a number of steps equal to the number of numeral keys which have been depressed. It is for this reason that the blocking keys 1, 2 and 3 have been provided, these keys being actuatable to close switches 299 and 300 across conductors 317 and 318 when the number entered in the machine is less than six places.

For example, if the number to be registered in the machine is 8M8, after the 8 key has been pressed the second time, the number 1 blocking key is depressed since the number includes only one numeral after the letter. The number 1 blocking key has a shield plate 36 associated therewith in exactly the same manner as the letter keys and after its depression the hot rod or wire is run through block 33 in the manner above described. In the subsequent operation of the machine as the number 8M8 is again entered, the number 1 blocking key will also be depressed and a through opening will be provided so that the photo-electric cell will be activated. The number 2 and number 3 blocking keys likewise have shield plates associated therewith and are used respectively when the number to be registered includes two or three numerals after the letter. It will be seen that if it were not for these blocking keys if the registered number were 8M8496 the photo-electric cell would be affected not only when the full number was again entered in the machine, but also when the first three, four or five places thereof were entered.

Due to the fact that each number key can select five separate shield plates it will be evident that the same numeral can be repeated five times in the same number, as for example in 8M8888, and each time another shield plate will be moved into the block 33. Also no confusion can result in the case of reversed numbers as in the case of 8M4 and 4M8. In entering the number 8M4, upon depression of the number 8 key the first one of the group of stop pins associated therewith would be lifted while the third one of the group of stop pins associated with the number 4 key would be lifted. In the case of the number 4M8 the first stop pin of the group associated with the number 4 key would be lifted and the third stop pin of the group associated with the number 8 key would be lifted. It will thus be seen that in the case of these two numbers entirely different shield plates are affected by the number 4 and 8 keys.

For each number set in the machine there is a sub-group of swingable plates having apertures which are in alignment only with each other in their limit position. Each sub-group consists of a maximum number of six swingable plates in the disclosed machine, although the sub-group may be composed of a lesser number, as for example, when the number 8M8 is set in the machine. In this case, the shield plate associated with the number 1 blocking key forms a member of the sub-group since it is perforated in alignment with the other plates at the original setting. However, if the number 8M8888 is set up in the machine and the number 8M8 is subsequently entered without having been previously set up, the actuated plates do not comprise a sub-group nor is the blocking plate, which now exercises a blocking function, a member of the sub-group. In each operating cycle of the machine, a number may be entered which may or may not affect a predetermined sub-group of plates and, as explained, a sub-group may comprise the predetermined maximum of six plates or a lesser number of plates.

Upon removal of the cover portion 26, and upon detaching shaft 29 from side plates 24 and 25, the block 33, Figure 2, may be bodily removed without interference from the cross members 30, 31 and 37, bar 277 moving out of the open upper ends of arms 275 and 276. There is no interference of the heel portions of plates 36 with the plates 78 and 92, since there is only an abutment relation of the latter. The block is removed in this manner when it is necessary to replace plates 36.

In the use of the machine just described, it will ordinarily be mounted in an automobile so as to be readily transportable to strategic positions and the position may be chosen without reference to any external source of current supply, the unit being self-contained in this respect. In the present machine signaling means only is provided to show that a number previously registered has been entered in the machine, it being assumed that the operator will remember the number just set and will thus be able to take the necessary steps. However, if desired, recording mechanism may be provided so that each number entered will be visible at least until the machine is cleared.

As intimated at the outset the invention is not limited in its application to machines of any particular capacity and the machine which has been specifically described may be appropriately enlarged where required. For example, each number key may be associated with groups of more than five stop pins so as to be able to handle numbers wherein the same numeral is apt to be repeated more than five times. Also, if in any particular case letters are apt to be repeated in the same indicia, each letter key may be provided with selective facilities such as herein have been described only in association with the number keys.

Thus, the machine of the present invention is susceptible of considerable variation as to the form and relation of its parts and as to capacity. Accordingly, the invention is not to be considered as limited by the specific disclosure herein, its scope being determined in the following claims.

We claim:

1. In apparatus of the class described, a group of plates mounted in side by side arrangement and movable from a normal position to a limit position, there being sub-groups of which the plates have apertures in alignment with each other in limit position to provide a through opening, the apertures of plates of different sub-groups being unalignable, a group of fixed plates, each of said movable plates when in limit position lying between a pair of said fixed plates, the fixed plates having apertures aligned with those of the plates of said sub-groups when the latter are in limit position, a light source and a light sensitive cell positioned relative to the fixed and movable plates so that light from the source may reach the cell through aligned apertures in the movable plates and fixed plates, and signalling means rendered operative upon activation of said cell.

2. In apparatus of the class described, a plurality of members movable from a normal to a limit position, selected ones of said members being provided with apertures which are in alignment when said selected ones of said members are in their limit position, a light source and a light sensitive cell positioned relative to said selected ones of said members so that light from the source may reach the cell through said aligned apertures, a shutter interposed between said source and cell, and means for automatically opening said shutter subsequent to the movement of all said selected ones of said members to limit position.

3. In apparatus of the class described, a plurality of members movable from a normal to a limit position, selected ones of said members being provided with apertures which are in alignment when said selected ones of said members are in their limit position, a light source and a light sensitive cell positioned relative to said selected ones of said members so that light from the source may reach the cell through said aligned apertures, a shutter interposed between said source and cell, shutter actuating mechanism including electro-magnetic means, a circuit for said electro-magnetic means, and means for automatically closing said circuit subsequent to the movement of all said selected ones of said members to limit position.

4. In apparatus of the class described, a plurality of plates movable between two positions, selector means operable to move said members, only a predetermined maximum number of said members being movable in an operative cycle of the apparatus, and separate selector means operable to move similarly others of said plurality of plates when less than said certain number of plates are moved by said first-mentioned selector means.

5. In apparatus of the class described, a plurality of members movable between two positions, selector means operable to move said members, only a predetermined maximum number of said members being movable in an operative cycle of the apparatus, separate selector means operable to move similarly others of said plurality of members when less than said certain number of members are moved by said first-mentioned selector means, an electric control circuit, means automatically closing said circuit when said certain number of said members are moved by said first-mentioned selector means, and means operable by the said separate selector means to close said circuit.

6. In apparatus of the class described, a plurality of members movable between two positions, selector means operable to move said members, only a predetermined maximum number of said members being movable in an operative cycle of the apparatus, separate selector means operable to move similarly others of said plurality of members when less than said certain number of members are moved by said first-mentioned selector means, an electric control circuit, means automatically closing said circuit when said certain number of said members are moved by said first-mentioned selector means, means operable by the said separate selector means to close said circuit, means operable to return all of said members, and means actuated by said last-mentioned means to break said circuit.

7. In apparatus of the class described, a plurality of selectively movable members, selector means operable to move a certain number of said members from one position to another, an electric control circuit, means for automatically closing said circuit subsequent to such movement of said certain number of said members, means including a bar movable in contact with said members for returning said members, and a switch actuated by said last-mentioned means to break said circuit.

8. In apparatus of the class described, a plurality of members pivoted in side by side arrangement and selectively swingable from a normal position to a limit position, selected ones of said members being provided with apertures which are in alignment when said selected ones of said members are in their limit position, an electric bulb and a light-sensitive cell positioned relative to said selected ones of said members so that light from the source may reach the cell through said aligned apertures, a bulb circuit, means automatically closing said circuit when said selected ones of said members are in their limit position, means including a bar movable in contact with said members for returning said selected ones of said members, and means actuated by said last-mentioned means for breaking said circuit.

9. In apparatus of the class described, a plurality of members pivoted in side by side arrangement and selectively swingable from a normal position to a limit position, selected ones of said members being provided with apertures which are in alignment when said selected ones of said members are in their limit position, an electric bulb and a light-sensitive cell positioned relative to said selected ones of said members so that light from the source may reach the cell through said aligned apertures, a shutter between said bulb and cell, a circuit, means automatically closing said circuit when said selected ones of said members are in their limit position, a relay in said circuit, a bulb circuit closed by said relay when the relay circuit is closed, and means actuated by said relay to effect opening of said shutter.

10. Apparatus according to claim 9 wherein a spring-impelled rotary cam element is provided for opening the shutter and a stop for said cam element is provided, said stop being withdrawn upon energization of the relay to permit a rotary movement of the cam element whereby opening of the shutter is effected.

11. In apparatus of the class described, a plurality of members pivoted in side by side arrangement and selectively swingable from a normal position to a limit position, selected ones of said members being provided with apertures which are in alignment when said selected ones of said members are in their limit position, an electric bulb and a light-sensitive cell positioned relative to said selected ones of said members so that light from the source may reach the cell through said aligned apertures, a shutter between said bulb and cell, a circuit automatically closed when said selected ones of said members are in their limit position, a relay in said circuit, a bulb and relay-holding circuit closed by said relay when the relay circuit is closed, means actuated by said relay to effect opening of said shutter, means for returning said selected ones of said members, and means actuated by said last-mentioned means for breaking the relay holding circuit.

12. Apparatus according to claim 11 wherein a spring-impelled rotary cam element is provided for opening the shutter and a stop for said cam element is provided, said stop being withdrawn upon energization of the relay to permit a rotary movement of the cam element whereby opening of the shutter is effected, and wherein the impelling means for the cam element comprises a spring, and means actuated by said returning means are provided for winding said spring.

13. In apparatus utilizing selector keys, means for providing a selective range for a single key, said means comprising, in combination with a single key, a plurality of independently movable control members associated therewith, and means for imparting successive operating movements of said key to successive ones of said control members, said last named means comprising a selector member constantly actuatable by the key and movable into operative position relative to said members individually to engage and move the same upon operation of the key.

14. In apparatus utilizing selector keys, means for providing a selective range for a single key, said means comprising, in combination with a single key, a plurality of independently movable control members associated therewith, and means for imparting successive operating movements of said key to successive ones of said control members, said last named means comprising a selector member constantly actuatable by the key and movable into operative position relative to said members individually to engage and move the same upon operation of the key, and means for automatically moving said selector member to a new position subsequent to each operation of the key.

15. In apparatus utilizing selector keys, means for providing a selective range for a single key, said means comprising, in combination with a single key, a pivoted key lever, a pivoted intermediate lever slidable in a direction parallel to the pivoting axis of said key lever, said intermediate lever having an arm expanded in the direction of said pivoting axis and engageable by the key lever throughout the sliding range of said intermediate lever, a plurality of movable members positioned along the path of movement of said intermediate lever, said intermediate lever having a finger adapted to engage said members successively to move the same upon actuation of said intermediate lever by the key lever.

16. In apparatus utilizing selector keys, means for providing a selective range for a single key, said means comprising, in combination with a single key, a pivoted key lever, a pivoted intermediate lever slidable in a direction parallel to the pivoting axis of said key lever, said intermediate lever having an arm expanded in the direction of said pivoting axis and engageable by the key lever throughout the sliding range of said intermediate lever, a plurality of movable members positioned along the path of movement of said intermediate lever, said intermediate lever having a finger adapted to engage said members successively to move the same upon actuation of said intermediate lever by the key lever, and means for imparting a step by step movement to said intermediate lever.

17. In apparatus utilizing selector keys, means for providing a selective range for a single key, said means comprising, in combination with a single key, a pivoted key lever, a carriage slidable adjacent said lever, an intermediate lever pivotally mounted on said carriage for participation in sliding movements of the latter, said intermediate lever having an arm expanded so as to be engageable by said key lever in all positions of said carriage, a plurality of movable members positioned along the path of movement of said intermediate lever, said intermediate lever having a finger adapted to engage said members successively to move the same upon actuation of said intermediate lever by the key lever.

18. Apparatus according to claim 17 wherein said single key is one of a series of keys each of which has similarly associated therewith an intermediate lever, all of the latter being mounted on the same carriage.

19. In apparatus of the class described, a slide spring-urged in one direction, a rack on said slide and a gear engaging said rack, a toothed ratchet in connection with said gear, a movable pawl carrier and a pair of pawls pivoted thereon and adapted for simultaneous or separate engagement with the ratchet to resist its rotation under the action of the slide, means for moving said carrier from a normal position in which one only of said pawls engages a tooth of the ratchet through a position in which both pawls engage the same tooth and to a position in which the first pawl releases the tooth while the latter is still engaged by the second pawl, means thereupon operative to swing said first pawl to a position behind, but out of the path of, the said tooth, return movement of said carrier releasing said second pawl from the said tooth and bringing said first pawl in front of the succeeding tooth whereby said first pawl is swung back to its original position.

20. In apparatus of the class described, a group of members which are movable independently of each other in the same direction from a normal to a limit position, means for selectively so moving said members, only a predetermined maximum number of said members being movable in an operative cycle of the apparatus, said maximum number of said members being less than the total number of said members, signalling means, and means controlled by only such members as are moved for controlling said signalling means.

21. In apparatus of the class described, a group of members which are movable independently of each other in the same direction from a normal to a limit position, means for selectively so moving said members, certain of said members less than the total number thereof being provided with apertures which are aligned in the limit position of said certain members, means operable to selectively move said members to their limit position whereby if said certain members only are moved, their aligned apertures provide a through opening unobstructed by any other of said members, a light source and a light sensitive cell so positioned that light from the former may reach the latter to activate the same only through said through opening when said certain members are in their limit position, and signalling means operated as a result of activation of said cell.

22. In apparatus of the class described, a group of members which are movable independently of each other in the same direction from a normal to a limit position, means for selectively so moving said members, certain of said members less than the total number thereof being provided with apertures which are aligned in the limit position of said certain members, means operable to selectively move said members to their limit position whereby if said certain members only are moved, their aligned apertures provide a through opening unobstructed by any other of said members, a light source and a light sensitive cell so positioned that light from the former may reach the latter to activate the same only through said through opening when said certain members are in their limit position, signalling means operated as a result of activation of said cell, and shutter means operative to shield the cell from the source when said members are in normal position.

23. In apparatus of the class described, a group of members which are movable independently of each other in the same direction from a normal to a limit position, means for selectively so moving said members, certain of said members less than the total number thereof being provided with apertures which are aligned in the limit position of said certain members, means operable to selectively move said members to their limit position whereby if said certain members only are moved, their aligned apertures provide a through opening unobstructed by any other of said members, a light source and a light sensitive cell so positioned that light from the former may reach the latter to activate the same only through said through opening when said certain members are in their limit position, signalling means operated as a result of activation of said cell, return means for the moved members, and shutter means rendered operative upon actuation of said return means to shield the cell from the source.

24. In apparatus of the class described, a block comprising a rod and a group of plates strung on said rod and maintained in fixed parallel relation thereon, plates pivotally mounted on said rod to swing into and out of the spaces between the fixed plates, the fixed plates being provided with a number of aligned apertures for the guidance of an elongated puncturing tool whereby to form aligned apertures in any pivotal plates which are between the fixed plates.

25. Structure according to claim 24, wherein the pivotal plates are initially apertured identically as the fixed plates and their apertures blocked with material removable by the puncturing tool.

26. Structure according to claim 24 wherein the pivotal plates have portions of initially unperforated material readily perforable by the puncturing tool.

27. In apparatus of the class described, a group of plates individually swingable about a common axis from a normal position to a limit position wherein they are in registering relation to each other, certain of said plates constituting subgroups of which the constituent plates have apertures which are aligned with each other in the limit position of the plates, none of the plates other than those of a given sub-group having an aperture alignable in limit position with the apertures of the plates of the given sub-group, and signalling means rendered operative when any one of said sub-groups is in limit position.

28. In apparatus of the class described, a group of individual plates swingable about a common axis from a normal position to a limit position wherein they are in registering relation to each other, a spring-influenced reciprocable member associated with each of said plates to swing the same, means for holding said reciprocable member in inoperative position against the spring action, and selective means for releasing said holding means whereby to release the associated members to swing the associated plates under the spring action.

29. In apparatus of the class described, a group of individual plates swingable about a common axis from a normal position to a limit position wherein they are in registering relation to each other, a spring-influenced reciprocable member associated with each of said plates to swing the same, means for holding said reciprocable member in inoperative position against the spring action, selective means for releasing said holding means whereby to release the associated members to swing the associated plates under the spring action, and a movable bar so positioned and so movable as to engage and return the swung plates to normal position.

30. In apparatus of the class described, a group of individual plates swingable about a common axis from a normal position to a limit position wherein they are in registering relation to each other, a spring-influenced reciprocable member associated with each of said plates to swing the same, means for holding said reciprocable member in inoperative position against the spring action, selective means for releasing said holding means whereby to release the associated members to swing the associated plates under the spring action, and a movable bar so positioned and so movable as to engage and return the swung plates to normal position and therewith said members to inoperative position.

31. In apparatus of the class described, a group of individual plates swingable about a common axis from a normal position to a limit position wherein they are in registering relation to each other, each plate comprising a segment-shaped portion and an extension on opposite sides of its axis, a reciprocable member associated with each of said plates and having an abutment thereon adapted to engage the plate extension in one direction of movement to swing the plate, spring means acting to move each of said members in said one direction, means for holding said members in inoperative position against the action of said spring means, and selective means for releasing said holding means.

32. In apparatus of the class described, a group of individual plates swingable about a common axis from a normal position to a limit position wherein they are in registering relation to each other, each plate comprising a segment-shaped portion and an extension on opposite sides of its axis, a reciprocable member associated with each of said plates and having an abutment thereon adapted to engage the plate extension in one direction of movement to swing the plate, spring means acting to move each of said members in said one direction, means for holding said members in inoperative position against the action of said spring means, selective means for releasing said holding means, and a movable bar so positioned and so movable as to engage said extensions and return the swung plates to normal position.

33. In apparatus of the class described, a group of individual plates swingable about a common axis from a normal position to a limit position wherein they are in registering relation to each other, each plate comprising a segment-shaped portion and an extension on opposite sides of its axis, a reciprocable member associated with each of said plates and having an abutment thereon adapted to engage the plate extension in one direction of movement to swing the plate, spring means acting to move each of said members in said one direction, means for holding said members in inoperative position against the action of said spring means, selective means for releasing said holding means, and a movable bar so positioned and so movable as to engage said extensions and return the swung plates to normal position and therewith said members to inoperative position.

34. In apparatus of the class described, a group of plates individually swingable on a common axis from a normal position to a limit position wherein they are in register with each other, there being one or more predetermined sub-groups of which the plates are provided with apertures aligned only with the others of the same sub-group in limit position to provide a through opening, and signalling means rendered operable when only the plates of a single sub-group are in limit position.

35. In apparatus of the class described, a group of selectively movable members, keys operable to move said members, only a predetermined maximum number of said members being movable in an operative cycle of the apparatus, a carriage, means for stepping said carriage upon each key operation, a circuit, and a switch operated to closed position by said carriage as said carriage moves to a final position when the last of said predetermined maximum number of plates is moved.

36. In apparatus of the class described, a group of selectively movable members, keys operable to move said members, only a predetermined maximum number of said members being movable in an operative cycle of the apparatus, a circuit, a switch in said circuit, means automatically closing said switch when said predetermined maximum number of members is moved, a second switch in said circuit, and a further key operable to close said second switch when less than said predetermined maximum number of members is moved.

37. In apparatus of the class described, a group of selectively movable members, keys operable to move said members, only a predetermined maximum number of said members being movable in an operative cycle of the apparatus, a carriage, means for stepping said carriage upon each key operation, a circuit, a switch operated to closed position by said carriage as said carriage moves to a final position when the last of said predetermined maximum number of plates is moved, a second switch in said circuit, and a further key operable to close said second switch when less than said predetermined maximum number of members is moved.

38. In apparatus of the class described, a group of members selectively movable from a normal position to a limit position wherein they are in register, only a predetermined maximum number of said members being movable in an operative cycle of the apparatus, there being one or more sub-groups of which the predetermined constituent members have apertures in alignment only with each other in limit position, and a blocking member movable to block the aligned apertures when less than all the members of a given group are moved in a single cycle.

39. Apparatus of the class described comprising means for receiving and carrying in selectable arrangement a multiplicity of given individual data, each datum having a plurality of components in certain order and the various data having different components or components in common but in different arrangement or association, keys of which each represents a component, there being a key for each possible component, means operative to select the carrying means for each individual datum when the keys representing the components thereof are operated, signalling means, and means automatically rendering said signalling means operative upon the proper selection of the carrying means for an individual datum by operation of the keys representing the components thereof in the order of such components.

40. Apparatus according to claim 39 wherein the carrying means for each datum comprises an individual member for each component of such datum and said elements are independently selectable by the keys.

ROBERT EDWARD PRUSSO.
ERMAL WILLIAM GADDY.